(12) United States Patent
Bedford et al.

(10) Patent No.: US 6,457,304 B1
(45) Date of Patent: Oct. 1, 2002

(54) METHOD AND APPARATUS FOR RETAINING A TRACK CHAIN JOINT

(75) Inventors: Billy R. Bedford, Peoria; Thomas E. Oertley, Dunlap; Loreena S. Plouse, Morton, all of IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/458,177

(22) Filed: Dec. 9, 1999

(51) Int. Cl.$^7$ ................................................ B21L 17/00
(52) U.S. Cl. .................. 59/7; 59/901; 29/517; 305/202
(58) Field of Search ................ 59/7, 9, 901; 29/401, 29/517; 305/202, 104

(56) References Cited

U.S. PATENT DOCUMENTS

| | | |
|---|---|---|
| 3,699,637 A | 10/1972 | Rosiek |
| 3,831,257 A | 8/1974 | Boggs et al. |
| 4,125,298 A | 11/1978 | Heurich et al. |
| 4,182,578 A | 1/1980 | Livesay et al. |
| 4,265,084 A * | 5/1981 | Livesay ........................... 59/7 |
| 4,288,172 A | 9/1981 | Livesay et al. |
| 4,618,190 A | 10/1986 | Garman et al. |
| 4,639,995 A | 2/1987 | Garman et al. |
| 5,183,318 A | 2/1993 | Taft et al. |
| 5,201,171 A | 4/1993 | Anderton et al. |
| 5,257,858 A | 11/1993 | Taft |
| 6,270,173 B1 | 8/2001 | Hashimoto et al. |

* cited by examiner

Primary Examiner—David Jones
(74) Attorney, Agent, or Firm—Calvin E Glastetter; Diana L Charlton

(57) ABSTRACT

A method and apparatus of assembling a joint of an endless track chain for track-type machines to prevent end play in the joint is disclosed. The joint includes a pair of links and a cylindrical pin. Each link includes a outwardly offset outboard end collar having a boss extending outwardly therefrom and a bore therethrough. Each boss has an outer surface. The pin includes opposite end portions. Each end portion is pressed and non-rotatably mounted into respective one of the bores of the outboard end collars. The method comprises the steps of forming an annular groove about each of the end portions, placing a swage tool against the outer side surface of the boss in axial alignment with the pin, and applying a sufficient force on the swage tool to form at least one mechanically formed nodule protruding from the outer side surface into a respective ones of the grooves. The nodule having a cross-sectional configuration substantially conforming to the groove.

18 Claims, 2 Drawing Sheets

METHOD AND APPARATUS FOR RETAINING A TRACK CHAIN JOINT

TECHNICAL FIELD

This invention relates generally to a track chain for use on earthmoving machines, and more particularly to a method and apparatus for retaining the joints of the track chain.

BACKGROUND ART

A track joint is usually held together by an interference fit between the ends of the track pins and their respective link bores into which the pin ends are tightly received. Even though a very high press force is used to press the links onto their respective pin ends, the links still have a tendency to move outwardly on the pin as a result of working forces exerted on the track during operation of the machine. This outward movement causes the joints to become loose or develop what is commonly referred to as end play.

Various methods have been tried to limit the amount of end play in track joints. Keeper assembles, such as those disclosed in U.S. Pat. No. 4,182,578 issued on Jan. 8, 1980 and U.S. Pat. No. 4,288,172 issued on Sep. 8, 1981, both to Richard Livesay et al. And both assigned to the assignee hereof, have been successfully employed to reduce such end play movement. In order to accommodate manufacturing tolerances, joints utilizing such keepers must have a certain amount of clearance which produces a limited amount of built-in end play. As a result, these keepers reduce, but do not completely eliminate end play.

Another method of limiting end play is disclosed in U.S. Pat. No. 3,831,257 issued on Aug. 27, 1974, to Roger L. Boggs et al., which patent is also assigned to the assignee hereof, wherein welding about the ends of the track pin is used. In this method, retention is dependent on the strength of the weld. In practice, weld strength is difficult to control with any degree of consistency. If a weld is so weld that it breaks, all of its retention ability is lost.

More recently, the method and apparatus for retaining a track joint disclosed in U.S. Pat. No. 5,201,171, issued on Apr. 13, 1993, to Peter Anderton et al. And also assigned to the assignee hereof, has been successfully utilized. In such apparatus and method, an appropriate groove must be machined in the pin and material from the boss is displaced in the radial direction into the groove of the pin.

The solution to the above problems is hampered by another problem, which is inability to change dimensions of the track. One such dimension is the rail-to-rail width or gauge of the track. Like railroad track, the track links provide a pair of rail surfaces on which the wheels or rollers of the machine ride. The rail width or gauge for any particular machine is, for all practical purposes, permanently set and cannot be changed. This is because any change in rail gauge would require corresponding changes in the remaining components of the machine undercarriage and because the changed track would not be interchangeable with the track of existing machines.

The present invention is directed to overcoming the shortcomings of the prior attempts at providing a track joint with restricted end play.

DISCLOSURE OF THE INVENTION

In one aspect of the present invention, there is provided a method of assembling a joint of an endless track chain for track type machines to prevent end play in the joint. The joint includes a pair of links and a cylindrical pin. Each link includes a laterally outwardly offset outboard end collar having a boss extending outwardly therefrom and a bore therethrough each boss having a side surface. The pin includes opposite end portions, each end portion being non-rotatably mounted into a respective one of the bores of the outboard end collars. The method comprising the steps of forming a annular groove about each of the end portions of the pin, placing a swag tool against the side surface of the boss in axial alignment with the pin, applying a sufficient force on the swag tool to form at least one mechanically formed nodule protruding from the side surface of the boss into respective one of the grooves of the pin, the nodule having a cross-sectional configuration substantially conforming to the groove.

In accordance with another aspect of the present invention, an apparatus for retaining the track joints of an endless track chain for a track-type machine is provided to prevent end play in the joints. Each joint includes a pair of links and a cylindrical pin. Each link has an outboard end collar with a pin boss extending outwardly therefrom and a bore therethrough. The pin boss has a side surface. Each pin has opposite end portions, each end portion being pressed and non-rotatably mounted into a respective one of the bores of the outboard end collars. The apparatus comprising an annular groove formed in each of the opposite end portions of the pin. Each groove is disposed within the bore at a location along the pin boss. At least one mechanically formed nodule protrudes from the side surface of the pin boss into respective ones of the pin grooves. Each nodule has a cross-sectional configuration substantially conforming to its groove and is formed from material that has been permanently extruded from the side surface of the pin boss into the groove.

BEST MODE FOR CARRYING OUT THE INVENTION

Figure 1:
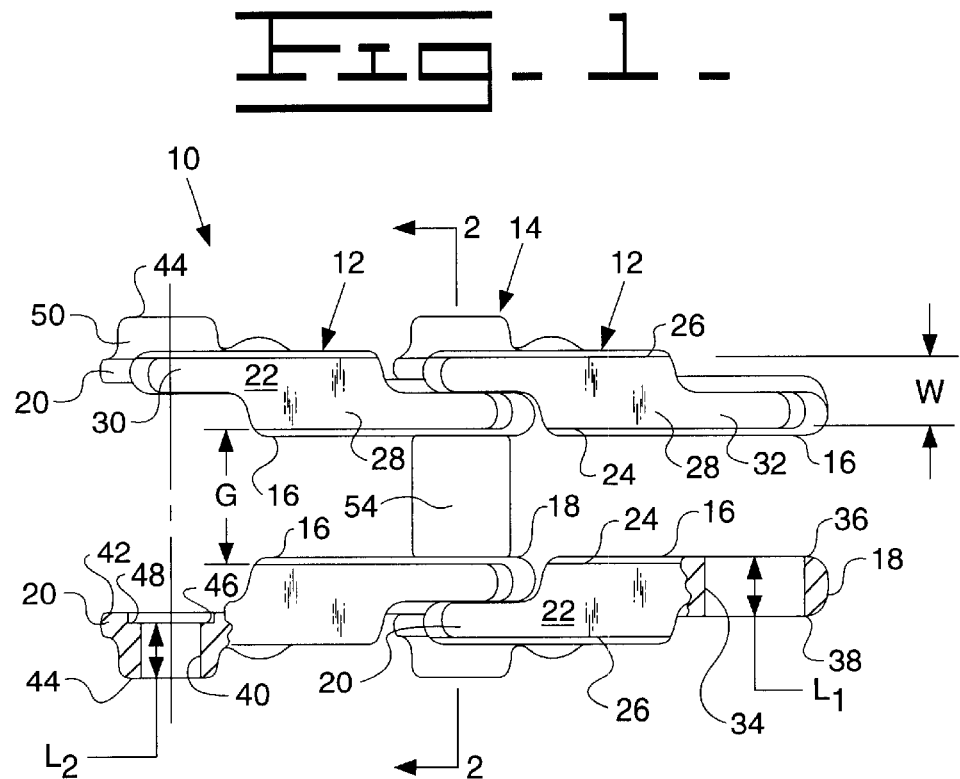
FIG. 1 is a plan view of a portion of an endless track chain embodying the present invention.
Figure 2:
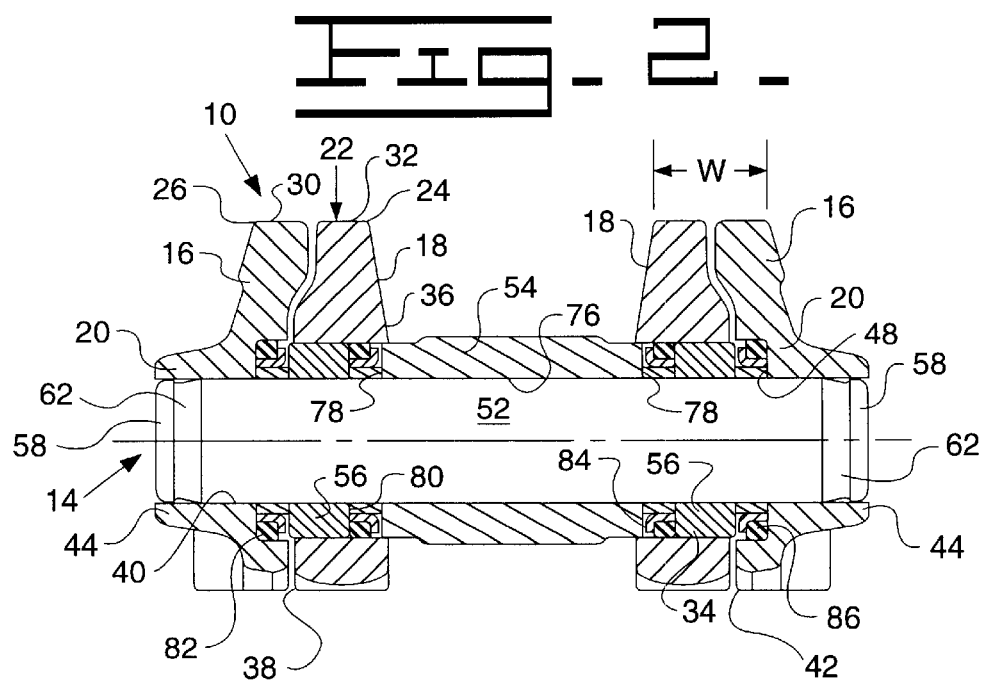
FIG. 2 is a transverse cross-sectional view taken along line 2—2 of FIG. 1 through a hinge joint.

Referring to the drawings, an endless track chain embodying the present invention is generally indicated at 10 in FIG. 1 for use on a track type machine (not shown). The track chain 10 is constructed from a plurality of link sets 12 which are articulately coupled in a transverse relation of the chain 10 by a plurality of hinge joints 14. Each link set 12 includes a pair of laterally spaced, longitudinally extending links, one being a right-hand link and the other being a left-hand link. As such links are mirror images of each other, both are referred to herein by reference numeral 16. Each link 16 is provided with an inboard end collar 18 and an opposite outboard end collar 20. The inboard end collar 18 is laterally offset inwardly toward the center of the track chain 10, while the outboard end collar 20 is laterally offset outwardly therefrom. Link 16 further includes a longitudinally disposed rail surface 22. The rail surface 22 has a predetermined overall width "W" between an inner edge 24 and an outer edge 26. The rail surface 22 includes a full width central portion 28, a generally one-half width outboard portion 30 which extends along the outer edge 26 over the outboard end collar 20 and a generally one-half width inboard portion 32 which extends along the inner edge 24 over the inboard end collar 18. The distance between the inner edge 24 of one link in the link set 12 to the inner edge 24 of the other link defines a rail gauge width "G".

The inboard end collar 18 has a first bore 34 therethrough extending from an inner surface 36 of the inboard end collar to an outer surface 38 thereof. The inner surface 36 is offset inwardly from the inner edge 24 of the rail surface 22. The outer surface 38 is offset outwardly relative to the inboard portion 32 of the rail surface 22 so as to be disposed in a position substantially closer to the outer edge 26 of the rail surface 22 than to the inner edge 24 thereof. This offset positioning of the inner and outer surfaces 36, 38, respectively, provide the first bore 34 with a predetermined bore length "L1" that is greater than one-half the width of the rail surface 22. Preferably, the outer surface 38 is positioned within a range of from substantially greater than 50 times to less than 1.0 times the rail width "W" from the inner rail edge 24.

The outer end collar 20 has a second bore 40 therethrough extending from an inner surface 42 to an outer side surface 44 of the outer end collar 20. Each second bore 40 has a counterbore 46 adjacent the inner surface 42. Each counterbore 46 has a radial shoulder 48 at the bottom thereof that is disposed outwardly from the inner surface 42. It should be appreciated that the offsetting relationship of the end collars 18, 20 permits the outboard end collar 20 of one link set to overlap the inboard end collar 18 of an adjoining link set in the track chain. As shown in the drawings, the outboard side surface 44 of the outboard end collar 20 is provided on a pin boss 50. The outer surface 44 is offset laterally a substantial distance from the outer edge 26 of the rail surface 22 to provide the second bore 40 with a predetermined bore length "L2" that is at least as great as the overall width "W" of the rail surface 22.

The joint 14 includes a cylindrical pin 52, a rotatable tubular bushing 54 and a pair of hardened sleeve bearings 56. The pin 52 has opposite end portions 58, each of which is pressed and non-rotatably mounted into a respective one of the second bores 40 of the outboard end collars 20 of each link 16 in a link set 12.

Figure 3:
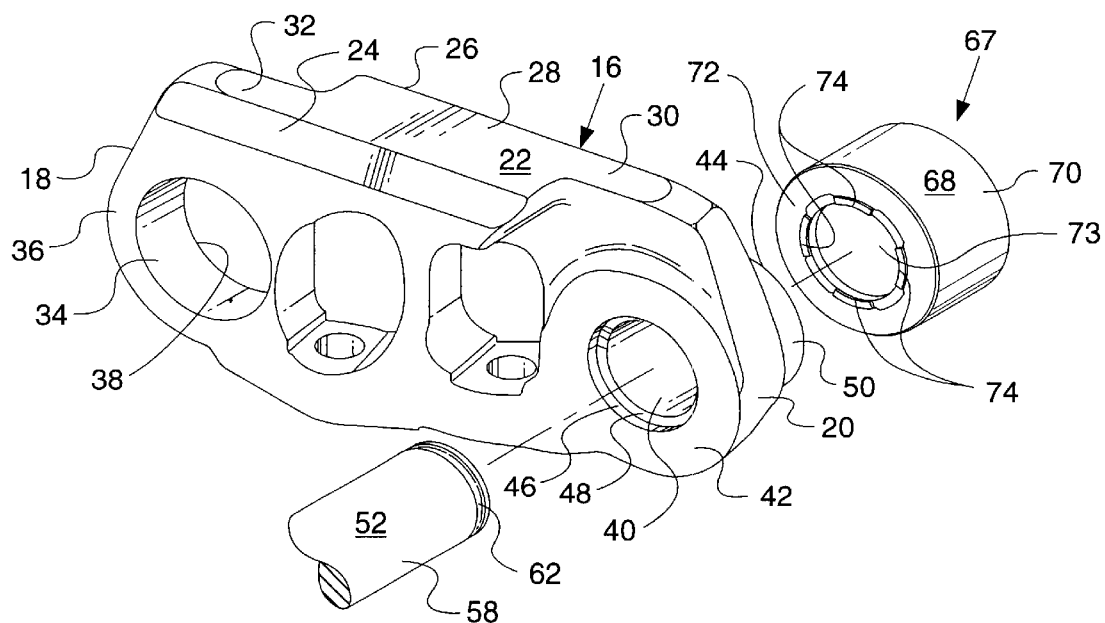
FIG. 3 is an exploded view showing a track link, a swag tool and a track pin of the present invention.
Figure 4:
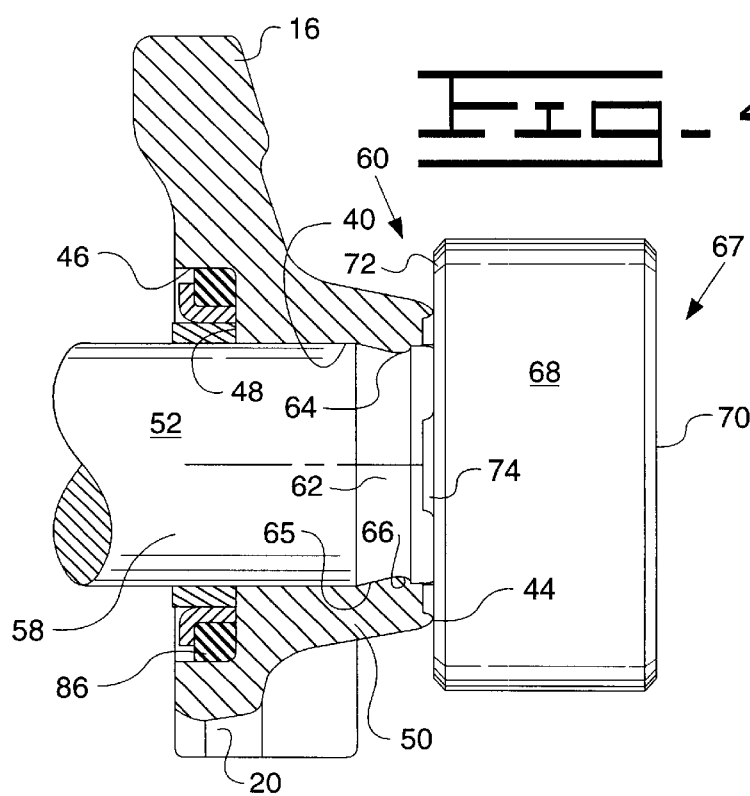
FIG. 4 is a fragmentary cross-sectional view of one of the joints shown in FIG. 2 and illustrating structure for mechanically interlocking the pin to the link.

Referring more particularly to FIGS. 3 and 4 the joint 14 further includes a mechanical interlocking means 60 for locking the pin 52 to the outboard end collar 20 to eliminate end play by preventing any axial movement of the links 16 along the pin 52. Mechanically interlocking means 60 comprises a circumferentially disposed groove 62 formed about each of the ends 58 of the pin 52 and at least one mechanically formed nodule 64, which is formed by extruding the outer surface 44 of the pin boss 50 into a respective one of the grooves 62. The groove 62 is formed by a frustoconical surface 65 connected to a radius 66. The frustoconical surface 65 is tapered toward the pin 52 end and the radius 66 is located outwardly of the frustoconical surface 65. The mechanically formed nodules 64 are preferably formed by a swage tool 66 axially pushing on the outer surface 44 of the boss 50.

The swage tool 67 includes a base 68 suitable to withstand high forces. The base 68 has a first surface 70 and a second surface 72 having a counterbore 73 for receiving the end 58 of the pin 52. A plurality of swage segments 74 extend from the second surface 72 for contact with the outer surface 44 of the boss 50. In the present embodiment four swage segments are shown however any number can be used without departing from the scope of the invention. The application of a sufficient force on the swage tool 67 will result in punch segments 74 extruding metal from the outer surface 44 of the boss 50 into the groove 62.

The tubular bushing 54 is provided with a pin bore 76 which is sized to freely rotatably mount the bushing 54 about the pin 52. Bushing 54 has a pair of opposite end faces 78 and is of a size to extend between and be freely rotatable relative to the inboard end collars 18.

The pair of hardened sleeve bearings 56 have a inner face 80 and an outer face 82. The sleeve bearings 56 are adapted to be press fitted in the bores 34 of the inboard end collar 18. It should be understood by those skilled in the art that such sleeve bearings 56 must have a certain minimum length that is sufficient to support the loads imposed upon the joint 14 during operation, as dictated by the weight and power of the machine on which the track chain 10 is placed. As can be seen, the first bores 34 are substantially larger than the second bores 40 in order to receive the sleeve bearings 56.

A first pair of seals 84 are provided for sealing between the bushing 54 and the inboard end collar 18 and a second pair of seals 86 provide sealing between the inboard end collar 18 and the outboard end collar 20.

A set of four thrust rings 88 are disposed internally of each of the seals 84, 86. The thrust rings 88 are provided to maintain a predetermined minimum axial spacing for the seals 84, 86 to prevent the seals from being crushed during assembly or operation.

INDUSTRIAL APPLICABILITY

The endless track chain 10 constructed in accordance with the teachings of the present of the present invention provides a structure which maintain structural integrity or load carrying capacity of the track chain to eliminate reduce end play and maintain the rail gauge dimension.

The mechanical interlocking means 60 is provided to eliminate end play in the joint 14. The interlocking means 60 includes the grooves 62 about the end portions 58 of the pin 52. Once the track chain 10 is assembled in a conventional manner with a track press, a suitable swage tool 67 is placed on each of the outer surfaces 44 provided on the bosses 50 of the outboard end collars 20 and in axial alignment with the pin 52. A suitable force is then applied to the swage tool 67 by means of a press or the like to extrude metal from the outer surface 44 of the pin boss 50 into the grooves 62 about the pin 52. The mechanically formed nodule 64 is formed by metal protruding from the outer surface 44 of the pin boss 50 into the groove 62. The nodule 64 has a cross-sectional configuration substantially conforming to the shape of the groove 62. The groove 62 is formed by a frustoconical 65 connected to a radius 66. In operation, the nodule 64 prevents any axial movement of the pin 52 in the second bore 40 in the outboard end collar 20, thus ensuring that the joint 14 remains tight without any end play.

In view of the forgoing, it is readily apparent that the present invention provides a method and apparatus for mechanically joining the track pin to the track link to eliminate end play in the track chain to improve the joint in the track chain.

Other aspects, objects and advantages of this invention can be obtained from a study of the drawings, the disclosure and the appended claims.

What is claimed is:

1. A method of assembling a joint of an endless track chain for track-type machines to prevent end play in the joint, the joint includes a pair of links and a cylindrical pin, each link includes a laterally outwardly offset outboard end collar having a boss extending outwardly therefrom and a bore therethrough, each boss having a outer side surface, and the pin includes opposite end portions, each end portion being non-rotatably mounted into a respective one of the bores of the outboard end collar, said method comprising the steps of:

forming a annular frustoconical groove about each of the end portions of the pin;

placing a swage tool against the outer side surface of the boss in axial alignment with the pin;

applying a sufficient force in the axial direction on the swage tool to form at least one mechanically formed nodule protruding from the outer side surface of the boss into a respective one of the frustoconical grooves of the pin, the nodule having a cross-sectional configuration substantially conforming to the frustoconical groove.

2. A method of assembling a joint of an endless track chain for track-type machines to prevent end play in the joint, the joint including a pair of links and a cylindrical pin, each link including a laterally outwardly offset outboard end collar having a boss extending outwardly therefrom and a bore therethrough, each boss having a outer side surface, and said pin including opposite end portions, each end portion being pressed and non-rotatably mounted into a respective one of said bores of said outboard end collars, the method comprising the steps of:

forming a annular frustoconical groove about each of the end portions of the pin;

placing a swage tool against the outer side surface of the boss in axial alignment with the pin;

applying a sufficient force on the swage tool to form at least one mechanically formed nodule extruded at the side surface of the boss into a respective one of the frustoconical grooves, the nodule having a cross-sectional configuration substantially conforming to the frustoconical groove.

3. An apparatus for retaining the track joints of an endless track chain for track-type machines to prevent end play in such joints, each joint including first and second pairs of links and a cylindrical pin, each link of the first pair of links having an inboard end collar with a first bore therethrough, and each link of the second pair of links having an outboard end collar with a pin boss extending outwardly therefrom and a second bore therethrough, the boss having an outer side surface, and the pin having opposite end portions, each end portion being pressed and non-rotatably mounted into a respective one of the second bores of the outboard end collars, the apparatus comprising:

an annular groove formed in each of the opposite end portions of the pin, each groove being disposed within the bore at a location along the pin boss with a portion of the groove having a frustoconical surface; and at least one mechanically formed nodule protruding axially from the outer side surface of the boss into respective ones of the frustoconical pin grooves, each nodule having a cross-sectional configuration substantially conforming to its frustoconical groove and being formed from material that has been permanently extruded axially at the side surface of the pin boss into the frustoconical groove.

4. The apparatus of claim 3, wherein the groove has a radius connected to the frustoconical surface.

5. The apparatus of claim 4 wherein the frustoconical surface tapers inwardly and toward the pin end.

6. The apparatus of claim 5 wherein the radius is located between the frustoconical surface and the pin end.

7. The apparatus of claim 4 wherein the frustoconical surface tapers toward the pin end.

8. The apparatus of claim 5 wherein the radius is located outwardly of the frustoconical surface.

9. An apparatus for retaining the track joints of an endless track chain for track-type machines to prevent end play in such joints, each joint including first and second pairs of links and a cylindrical pin, each link of the first pair of links having an inboard end collar with a first bore therethrough, and each link of the second pair of links having an outboard end collar with a pin boss extending outwardly therefrom and a second bore therethrough, the boss having a outer side surface, and the pin having opposite end portions, each end portion being pressed and non-rotatably mounted into a respective one of the second bores of the outboard end collars, the apparatus comprising;

a annular groove formed in each of the opposite end portions of the pin, each groove being disposed within the bore at a location along the pin boss, the groove is formed from a frustoconical surface and a radius connected to the frustoconical surface; and at least one mechanically formed nodule protruding axially from the outer side surface of the boss into respective ones of the pin grooves, each nodule having a cross-sectional configuration substantially conforming to its groove and being formed from material that has been permanently extruded axially at the side surface of the pin boss into the groove.

10. A method for retaining the track joints of an endless track chain for track-type machines, each track joint having first and second links and a pin, comprising:

forming a groove along a portion of the pin, a portion of the groove having a frustoconical surface; and applying a sufficient force on one of the first or second links in an axial direction relative to the pin to form a mechanically formed nodule, the mechanically formed nodule protruding from the one of the first or second links and into the groove.

11. The method for retaining the track joints of claim 10, including the steps of:

forming a radius on the groove that extends outwardly from the frustoconical surface.

12. The method for retaining the track joints of claim 10, wherein the step of applying a sufficient force includes the step of:

obtaining a cross-sectional configuration of the mechanically formed nodule substantially conforming to the frustoconical surface and radius of the groove.

13. A method for retaining the track joints of an endless track chain for track-type machines, each track joint having first and second links and a pin, comprising:

forming a groove along a portion of the pin, the groove having a surface defined by a first geometric shape and a second geometric shape different from the first geometric shape; and applying a sufficient force on one of the first or second links in an axial direction relative to the pin to form a mechanically formed nodule, the mechanically formed nodule protruding from the one of the first or second links and into the groove.

14. The method for retaining the track joints of claim 13, wherein the step of forming the groove includes the step of:

forming the first geometric shape to incline inwardly toward the center of the pin; and forming the second geometric shape to incline outwardly from the first geometric shape.

15. The method for retaining the track joints of claim 13, including the step of:

obtaining a cross-sectional configuration of the mechanically formed nodule substantially conforming to the first and second geometric shapes of the groove.

16. A method for retaining the track joints of an endless track chain for track-type machines, each track joint having first and second links and a pin, comprising:

forming a groove along a portion of the pin, the groove having a surface that tapers inwardly a predetermined depth along a substantial straight path toward the center of the pin to define a first geometric shape and extends outwardly from the first geometric shape to define a second geometric shape; and applying a sufficient force on one of the first or second links in an axial direction relative to the pin to form a mechanically formed nodule, the mechanically formed nodule protruding from the one of the first or second links and into the groove.

17. The method for retaining the track joints of claim 16, wherein the step of forming the groove includes the step of:

forming the surface with the second geometric shape being different from the first geometric shape.

18. The method for retaining the track joints of claim 16, including the step of:

obtaining a cross-sectional configuration of the mechanically formed nodule substantially conforming to the first and second geometric shapes of the groove.

* * * * *